United States Patent [19]

Bleggi

[11] Patent Number: 4,517,761
[45] Date of Patent: May 21, 1985

[54] BOAT RAILING MOUNTED FISHING ROD HOLDER

[76] Inventor: Joseph N. Bleggi, 2216 Parkhaven Dr., Plano, Tex. 75075

[21] Appl. No.: 463,715

[22] Filed: Feb. 4, 1983

[51] Int. Cl.³ .............................................. A01K 97/10
[52] U.S. Cl. ..................................................... 43/21.2
[58] Field of Search ................ 43/21.2, 54.1; 248/514, 248/538, 534, 302

[56] References Cited

U.S. PATENT DOCUMENTS

| | | | |
|---|---|---|---|
| 2,487,094 | 11/1949 | Brown | 248/538 X |
| 2,803,387 | 8/1957 | Pearce | 43/21.2 X |
| 3,015,467 | 1/1962 | Vieaux | 43/21.2 X |
| 3,020,014 | 2/1962 | Emery | 248/514 |
| 3,411,739 | 11/1968 | Barfield | 43/21.2 X |
| 3,523,666 | 8/1970 | Bloodsworth | 248/514 |

Primary Examiner—Nicholas P. Godici
Attorney, Agent, or Firm—Warren H. Kintzinger

[57] ABSTRACT

A fishing rod holder mountable on a boat railing without any permanent attachment to the boat such as by screws, bolts or clamps and easy placement without tools. The holder is constructed generally of one piece of wire bend formed to the desired shape and used as such or includes a plastic tubular soft protective cover to protect a fishing rod and/or the boat railing and boat side top where it is mounted. A cross chain may also be included with the holder if a fishing pole is to be held at a different, steeper angle as opposed to just being held against the boat rail itself.

5 Claims, 5 Drawing Figures

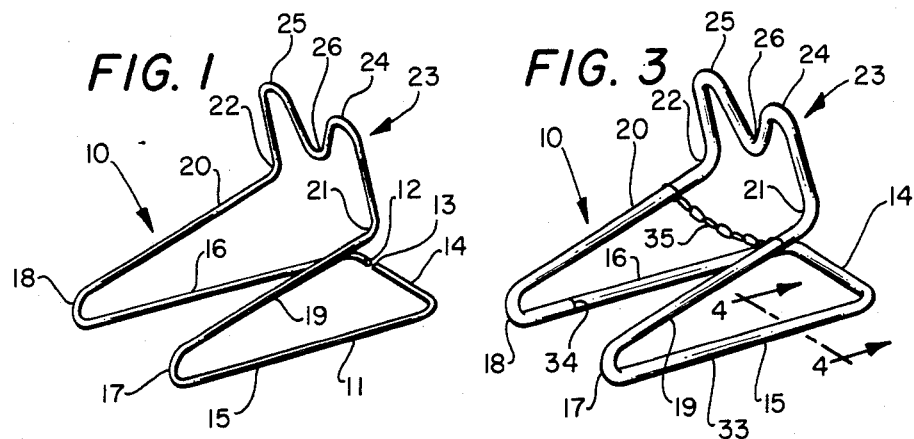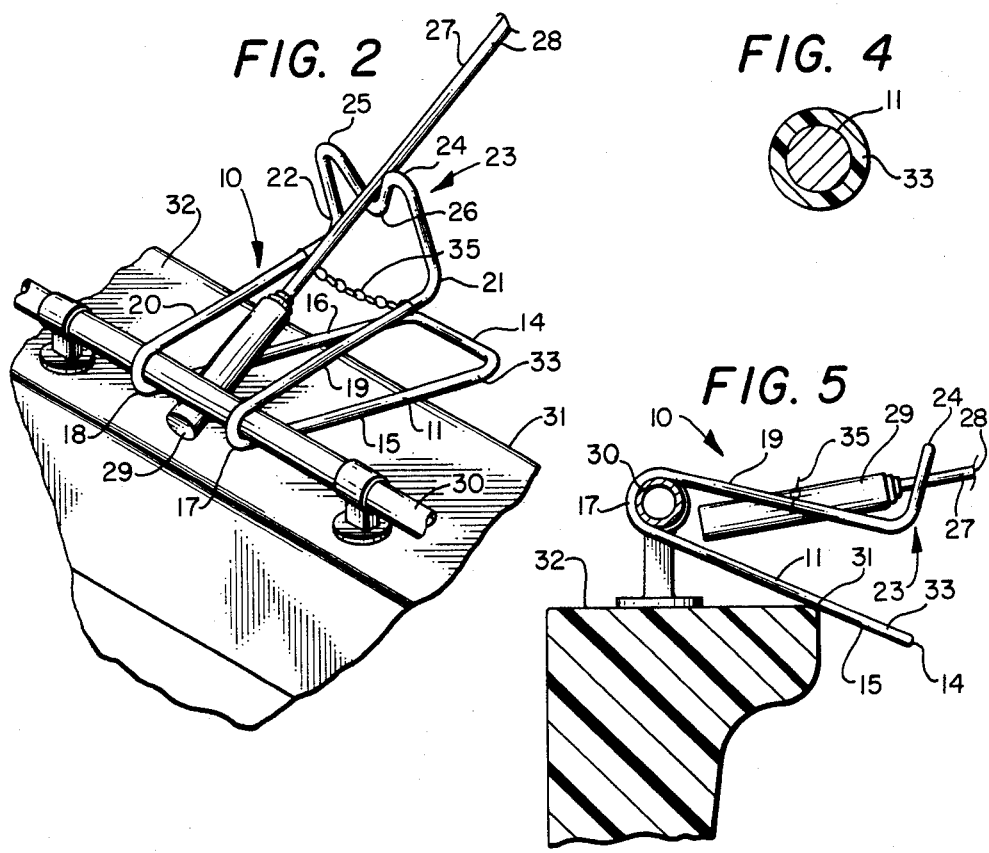

BOAT RAILING MOUNTED FISHING ROD HOLDER

BACKGROUND OF THE INVENTION

This invention relates in general to fishing rod holders used in boats and, in particular, to a wire fishing rod holder that mounts on a boat side top and top railing without permanent attachment to the boat as with screws, bolts or clamps and without the use of tools.

In fishing from a boat many fishermen using a pole drop a line into the water and hold the pole for extended periods of time waiting for a fish to strike. From the physical and psychological standpoint this can be quite tiring, waiting to catch a fish, grasping the fishing rod while either seated or standing. As a result the fisherman will many times put the rod down propping it on a boat structure but this approach is unreliable with constant boat rolling and pitching movement causing a rod to move from a propped position and even at times being lost overboard into the water. In an effort to alleviate this situation many fishing rod devices have been devised but most of these require attachment to a boat as by screws, bolts or clamps and also require the use of tools. Further, many of these existing rod devices are to varying degrees expensive and/or cumbersome and in many instances cause damage to the boat.

It is, therefore, a principal object of this invention to provide a reliable and easy to use fishing rod holder.

Another object is to provide such a fishing rod holder that is relatively inexpensive and easy to mount.

A further object is to provide such a fishing rod holder that mounts on a boat side top and side rail without any permanent attachment to the boat required.

Still another object is to provide such a fishing rod holder that may be mounted without the use of any tools and that does not damage a boat in any way.

Features of this invention useful in accomplishing the above objects include a boat railing mounted fishing rod holder of one piece of wire bend formed to a desired shape in which it may be used for the fishing rod holding function desired. A plastic tubular soft protective cover may be placed on the fishing rod holder formed wire to insure protection of fishing rod and also boat railing along with the boat side top where the fishing rod holder is mounted. A cross chain can also be included that is positionable along upper sides of the fishing rod holder in order that a fishing rod, or pole, be held at a different, steeper angle as opposed to just being held against the boat rail itself.

A specific embodiment representing what is presently regarded as the best mode for carrying out the invention is illustrated in the accompanying drawing.

BRIEF DESCRIPTION OF THE DRAWING

In the drawing:

FIG. 1 is a perspective view of the basic single wire formed fishing rod holder;

FIG. 2, a partial perspective view of a holder mounted on a boat railing and on the top of a boat side holding a fishing rod;

FIG. 3, a perspective view like FIG. 1 of the wire formed fishing rod holder with a plastic tubular soft protective cover on the wire holder form and a cross chain extended across from holder top side to side;

FIG. 4, a cross-section taken along line 4—4 of FIG. 3 showing detail of the plastic tube on the wire holder form; and, FIG. 5, a partial side elevation view of the wire formed fishing rod holder mounted on a boat railing and on the top of a boat side holding a fishing rod but with the rod, through use of the cross chain, held at a different, steeper angle as opposed to just being held against the boat rail itself.

DESCRIPTION OF THE PREFERRED EMBODIMENT

Referring to the drawing:

The basic wire bent form for the fishing rod holder 10 is formed from a single wire 11 with, in this instance, the break between wire ends 12 and 13 in the back cross extension 14 from base spaced generally parallel sides 15 and 16. The wire 11 is formed with upward extended duplicate elbow bends 17 and 18, respectively, from which upper side portions 19 and 20 extend upward and backward generally overlying sides 15 and 16, respectively. The upper side portions 19 and 20 at the back ends thereof are formed with upward bends 21 and 22, respectively, and are interconnected by an upstanding "M" like shape 23 with peaks 24 and 25 joined by a "U" shaped portion 26 for receiving and leaning support to the shank 27 of a fishing rod 28 appearing in FIG. 2 with pole handle 29 positioned under boat side rail 30. The fishing rod holder 10 may be mounted on a boat side rail 30 as shown in FIG. 2 with the bottom sides 15 and 16 resiliently pressing down on the outer edge 31 of the boat side top 32 to reactively support a fishing pole 28 held thereby. The holder 10 resiliently resists generally any varying forces transmitted thereto by the pole 28 as a fish pulls on the fishing line extended from fishing pole 28.

The fishing rod holder 10 of FIG. 1 may be used directly without a protective coating for mounting much the same as shown in FIG. 2 where it is equipped with a tubular soft plastic protective cover 33 for fishing rod 28 protection and also boat railing and boat side top protection. The tubular plastic cover 33 with additional detail in FIGS. 3 and 4 is of such length that when placed on wire 11 in its holder 10 bent form the ends thereof form generally a slit 34 or small end gap. A cross chain 35 shown in FIGS. 2, 3 and 5, is added to the fishing rod holder 10 when it is desired to give the holder the additional capability of holding a fishing rod 28, or pole, at a different, steeper angle as opposed to just being held against the boat rail itself. This alternate rod 28 holding approach is with rod handle 29 positioned under the cross chain 35 that, for additional rod holding angle adjustment, is positionable along the upper sides of the fishing rod holder 10.

Whereas, this invention is herein is illustrated and described with respect to a plurality of embodiments thereof, it should be realized that various changes may be made without departing from the essential contributions to the art made by the teachings hereof.

I claim:

1. A fishing rod holder mountable on a boat railing and a boat side top comprising: one piece of wire bend formed to shape for the fishing rod holding function desired; said one piece of wire formed with two bottom spaced generally parallel sides, and upwardly extended from said bottom sides, elbow means for capturing the rail of the boat with said elbow means in the form of duplicate elbow bends generally sized to fit a boat railing spaced from and above a boat side top with said bottom spaced parallel sides being support means extending beyond and resting on an outer edge of said boat side top when said holder is mounted on a boat railing and a boat side top for reactively supporting the holder in place without any permanent attachment to the boat; upwardly and rearwardly extending upper sides extending from the tops of said elbow bends generally overlying two bottom spaced generally parallel sides; and at the back ends of said upper sides a cross interconnect back including a "U" shaped portion for receiving and lending support to the shank of a fishing rod with the handle positioned under other structure; wherein the rearwardly extending upper sides are formed with upward bends at the back ends of the upper sides interconnected by an upstanding "M" wire formed shape as said cross interconnect back; and with said "U" shaped portion generally in the middle of said upstanding "M" wire formed shape.

2. The fishing rod holder of claim 1, wherein cross connective means is mounted on and extended between said rearwardly extending upper sides; and said cross connective means is fitted to said upper sides to be positionable along the upper sides of the fishing rod holder.

3. The fishing rod holder of claim 2, wherein said cross connective means is useable as said other structure with the rod handle of a fishing rod held by the fishing rod holder being positionable under said cross connective means.

4. The fishing rod holder of claim 3, wherein said cross connective means is a cross chain positionable along the upper sides of the fishing rod holder.

5. The fishing rod holder of claim 1, wherein a tubular plastic cover is provided on said wire bend formed to the holder shape substantially co-extensive to the length of said wire.

* * * * *